(12) United States Patent
Demulder et al.

(10) Patent No.: US 10,394,619 B2
(45) Date of Patent: Aug. 27, 2019

(54) SIGNATURE-BASED SERVICE MANAGER WITH DEPENDENCY CHECKING

(71) Applicant: Amplidata N.V., Ghent (BE)

(72) Inventors: Timothy Demulder, Zwijnaarde (BE); Wim De Waegeneer, Ghent (BE)

(73) Assignee: Western Digital Technologies, Inc, San Jose, CA (US)

( * ) Notice: Subject to any disclaimer, the term of this patent is extended or adjusted under 35 U.S.C. 154(b) by 144 days.

(21) Appl. No.: 15/243,708

(22) Filed: Aug. 22, 2016

(65) Prior Publication Data
US 2018/0052718 A1    Feb. 22, 2018

(51) Int. Cl.
G06F 9/46 (2006.01)
G06F 9/52 (2006.01)
G06F 9/48 (2006.01)

(52) U.S. Cl.
CPC .............. *G06F 9/52* (2013.01); *G06F 9/4843* (2013.01)

(58) Field of Classification Search
None
See application file for complete search history.

(56) References Cited

U.S. PATENT DOCUMENTS

| | | | |
|---|---|---|---|
| 6,640,203 B2 | 10/2003 | Brown et al. | |
| 6,681,242 B1* | 1/2004 | Kumar | G06F 9/52 709/223 |
| 6,964,047 B2 | 11/2005 | Fenchel | |
| 7,114,104 B1 | 9/2006 | Bennett | |
| 7,185,320 B2 | 2/2007 | Gouriou et al. | |
| 7,376,951 B1 | 5/2008 | Yip et al. | |
| 7,415,699 B2 | 8/2008 | Gouriou et al. | |
| 7,587,725 B2 | 9/2009 | Morrison et al. | |
| 7,703,096 B1 | 4/2010 | Frey-Ganzel et al. | |
| 2003/0110416 A1 | 6/2003 | Morrison et al. | |
| 2008/0196024 A1* | 8/2008 | Barfield | G06F 8/60 717/177 |
| 2011/0225463 A1 | 9/2011 | Davis et al. | |
| 2014/0149455 A1 | 5/2014 | Carr et al. | |
| 2015/0207805 A1* | 7/2015 | Blair | H04L 9/3247 713/176 |
| 2016/0011911 A1* | 1/2016 | Rangaraju | G06F 9/5061 718/104 |

FOREIGN PATENT DOCUMENTS

CN    101630262    1/2010

OTHER PUBLICATIONS

International Search Report and Written Opinion, PCT/IB2017/053498, dated Oct. 5, 2017 (14 pages).

* cited by examiner

*Primary Examiner* — Bing Zhao
(74) *Attorney, Agent, or Firm* — Patent Law Works LLP

(57) ABSTRACT

The present disclosure relates to systems and methods of implementing a service manager. In particular, the present disclosure relates to methods of monitoring a plurality of services, wherein each service is uniquely identifiable in a process table based on a fingerprint; receiving a request to add a new service to the plurality of services; determining whether service dependencies in a configuration of the plurality of services and the new service are compatible; and responsive to determining that the service dependencies in the configuration of the plurality of services and the new service are compatible, starting the new service. The method may further include receiving a request to call a user-defined function and determining whether the new service is functional based on executing the user-defined function.

23 Claims, 6 Drawing Sheets

SIGNATURE-BASED SERVICE MANAGER WITH DEPENDENCY CHECKING

FIELD OF THE INVENTION

The present disclosure relates to systems and methods for managing services on computer systems. In particular, the present disclosure relates to methods for managing services without relying on process identifiers.

BACKGROUND

Typically, an operating system includes a service manager capable of running multiple service processes. The operating system relies on a process identifier (process ID or PID) of a process to uniquely identify and manage the process. The PID can be written to a documented file location called "pidfile", and a kernel of the operating system may look up the PID in the pidfile to communicate with the process (for example, to stop it). Sometimes, an application or a computer program associated with a process may terminate inadvertently (e.g., crash or restart). It is common for the pidfile to not be updated to reflect this new development and thus become stale. A stale pidfile may include the PID of the process, but the process itself may have been terminated. Further, when the process restarts, there may be a new PID assigned to the process by the operating system. This gives rise to a discrepancy between the actual PID of the process and the old PID maintained within the pidfile. Ultimately, the service manager is unable to control the process and thereby may require a manual intervention to clear the discrepancy.

Thus, to increase the efficient management of processes, there is a need for a service manager to identify and manage the processes without using PIDs.

SUMMARY

Systems and methods for implementing a service manager are disclosed. The systems and methods introduced herein manage services without using the process identifiers (PIDs) to identify the services. For example, in some implementations, a system includes one or more processors and a memory storing instructions that cause the one or more processors to monitor a plurality of services, wherein each service is uniquely identifiable in a process table based on a fingerprint; receive a request to add a new service to the plurality of services; determine whether service dependencies in a configuration of the plurality of services and the new service are compatible; and responsive to determining that the service dependencies in the configuration of the plurality of services and the new service are compatible, start the new service.

These and other implementations may each optionally include one or more of the following features, such as: determining whether a prerequisite service of a service in the configuration exists; determining whether a prerequisite service of a service in the configuration requests the service to stop; determining whether a service and a prerequisite service of the service in the configuration create an infinite loop; determining whether a service in the configuration requests a disabled service; determining whether a service in the configuration requests to both start and stop a prerequisite service of the service; determining whether a service in the configuration requests to start itself; determining whether a service in the configuration requests to stop itself; receiving a return code of the new service, and determining that the new service started up successfully based on the return code; receiving a request to call a user-defined function, and determining whether the new service is functional based on executing the user-defined function.

Other implementations of one or more of these aspects include corresponding systems, apparatus, methods, and computer programs, configured to perform the actions of the methods, encoded on computer storage devices. It should be understood that the language used in the present disclosure has been principally selected for readability and instructional purposes and not to limit the scope of the subject matter disclosed herein.

BRIEF DESCRIPTION OF THE DRAWINGS

The techniques introduced herein are illustrated by way of example, and not by way of limitation, in the figures of the accompanying drawings in which like reference numerals are used to refer to similar elements.

DETAILED DESCRIPTION

Systems and methods for implementing a service manager are disclosed. While the systems and methods of the present disclosure are described in the context of a particular system architecture, it should be understood that the systems and methods can be applied to other architectures and organizations of hardware.

Figure 1:
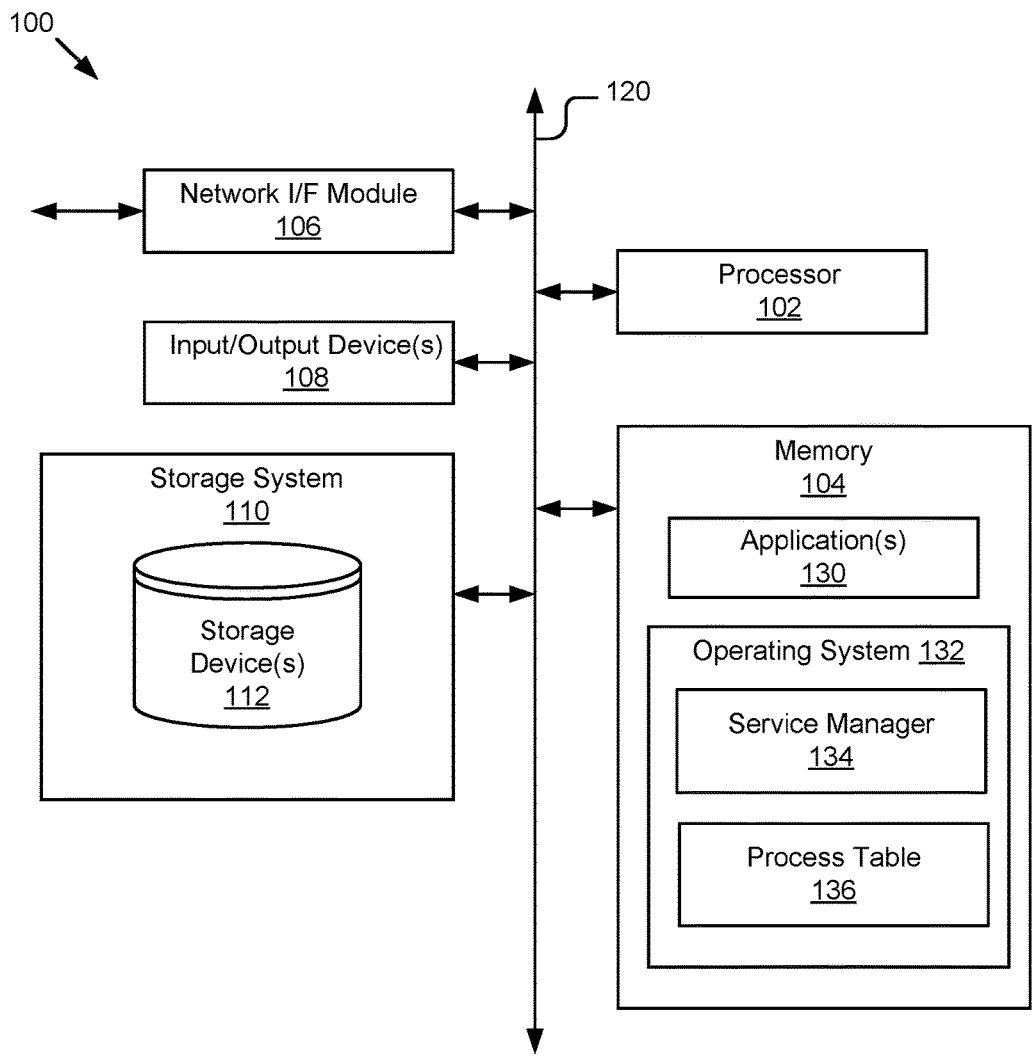
FIG. 1 is a block diagram illustrating an example system configured to implement a service manager for managing services.

FIG. 1 is a block diagram illustrating an example system 100 configured to implement the techniques introduced herein. The system 100 can be any computing device including one or more memory and one or more processors, for example, any electronic device capable of making requests and/or servicing incoming requests. The system 100 may execute an application(s) 130 that makes storage requests to the storage system 110.

The system 100 may include a processor 102, a memory 104, a network interface (I/F) module 106, input/output device(s) 108, and a storage system 110. The components of the system 100 are communicatively coupled to a bus or software communication mechanism 120 for communication with each other.

In some implementations, software communication mechanism 120 may be an object bus (e.g., Common Object Request Broker Architecture (CORBA)), direct socket communication (e.g., Transmission Control Protocol/Internet Protocol (TCP/IP) sockets) among software modules, remote procedure calls, User Datagram Protocol (UDP) broadcasts and receipts, Hypertext Transfer Protocol (HTTP) connections, function or procedure calls, etc. Further, any or all of the communication could be secure (Secure Shell (SSH), HTTP Secure (HTTPS), etc.). The software communication mechanism 120 can be implemented on any underlying hardware (for example, a network, the Internet, a bus, a combination thereof, etc.).

The network interface (I/F) module 106 is configured to connect system 100 to a network and/or other system. For example, network interface module 106 may enable communication through one or more of the Internet, cable networks, and wired networks. The network interface module 106 links the processor 102 to a network that may in turn be coupled to other processing systems (e.g., a server or client device). The network interface module 106 also provides other conventional connections to the network for distribution and/or retrieval of files and/or media objects using standard network protocols such as TCP/IP, HTTP, HTTPS and Simple Mail Transfer Protocol (SMTP) as will be understood. In some implementations, the network interface module 106 includes a transceiver for sending and receiving signals using Wi-Fi, Bluetooth®, or cellular communications for wireless communication.

The input/output device(s) ("I/O devices") 108 may include any device for inputting information into or outputting information from the system 100 and may be coupled to the storage system 110 either directly or through intervening I/O controllers. The I/O devices 108 may include a keyboard, mouse, camera, stylus, touch screen, display device to display electronic images, printer, speakers, etc. An input device may be any device or mechanism of providing or modifying instructions in the system 100. An output device may be any device or mechanism of outputting information from the system 100 (for example, it may provide information on active processes such as: process name, command line parameters, process attributes, etc.). For purposes of this application, the terms "process," "service," "service process," and "task" are used interchangeably to mean the same thing, namely, a series of operations carried out by a processor in the execution of a program.

The processor 102 may include an arithmetic logic unit, a microprocessor, a general purpose controller or some other processor array to perform computations. In some implementations, the processor 102 is a hardware processor having one or more processing cores. The processor 102 is coupled to the bus 120 for communication with the other components of system 100. Processor 102 processes data signals and may include various computing architectures including a complex instruction set computer (CISC) architecture, a reduced instruction set computer (RISC) architecture, or an architecture implementing a combination of instruction sets. Although only a single processor is shown in the example of FIG. 1, multiple processors and/or processing cores may be included. It should be understood that other processor configurations are possible.

The storage system 110 is a data storage system that may store information on any type of attached array of writable storage media, such as magnetic disk or tape, optical disk, flash memory, solid-state drive (SSD), electronic random access memory (RAM), micro-electro mechanical and/or any other similar media adapted to store information, including data and parity information. The storage device(s) 112 may include one or more non-transitory computer-readable mediums for storing data. In some implementations, the storage device 112 may be incorporated with the memory 104 or may be distinct therefrom.

In some implementations, the storage system 110 includes a storage interface (I/F) module (not shown) that cooperates with operating system 132 to access information requested by a user, the application(s) 130, a client device, etc. The storage OF module includes a plurality of ports having input/output (I/O) interface circuitry that couples with the writeable storage media over an I/O interconnect arrangement. In some implementations, the storage system 110 may include configuration files of processes that may be accessed by the operating system 132. For example, processes are configured in configuration files. In some implementations, the configuration files can be additionally or alternatively stored in memory 104.

The memory 104 stores instructions and/or data that may be executed by the processor 102. The memory 104 is coupled to the bus 120 for communication with the other components of the system 100. The instructions and/or data stored in the memory 104 may include code for performing any and/or all of the techniques described herein. The memory 104 may be, for example, volatile memory such as a dynamic random access memory (DRAM) device, a static random access memory (SRAM) device, or some other memory devices. In some implementations, the memory 104 also includes a non-volatile memory or similar permanent storage device and media (for example, a hard disk drive, a floppy disk drive, a compact disc read only memory (CD-ROM) device, a digital versatile disc read only memory (DVD-ROM) device, a digital versatile disc random access memory (DVD-RAM) device, a digital versatile disc rewritable (DVD-RW) device, a flash memory device, or some other non-volatile storage device).

In some implementations, the memory 104 includes application(s) 130 configured to be executed by the processor 102 and an operating system 132. The application(s) 130, stored on the memory 104, may be a collection of instructions or computer logic that performs operations on the system 100. The application(s) 130 may include one or more source programs, scripts, object code, or other collections each comprising a set of instructions to be performed. The application(s) 130 may encompass multiple processes that can be active at any given time in the system 100. A process may be made up of multiple threads of execution.

The operating system 132, stored on memory 104 and configured to be executed by the processor 102, is a component of system software that manages hardware and software resources in a computing system. The operating system 132 includes a kernel that controls the execution of the application(s) 130 by managing input/output requests from the application(s) 130. The application(s) 130 requests a service from the kernel of the operating system 132 through system calls. For example, the system calls may include creation and execution of new processes. In addition, the operating system 132 may provide scheduling, data management, memory management, communication control and other related services. For example, the operating system 132 is responsible for recognizing input from a keyboard, sending output to a display screen, tracking files on a disk, and controlling peripheral devices (e.g., a printer). In one embodiment, the operating system 132 is a general-purpose operating system. For example, the operating system 132 may be Microsoft Windows®, Mac OS® or UNIX® based operating system installed on a personal computer. Or the operating system 132 may be a mobile operating system, such as Android® or iOS®, installed on a mobile device. In another embodiment, the operating system 132 may be a special-purpose operating system. For example, the operating system 132 is a Storage Virtualization Operating System (SVOS) that provides system element management and advances storage system functions.

As depicted in the example of FIG. 1, the operating system 132 includes a service manager 134 and a process table 136. In some implementations, the service manager 134 manages the multiple processes for the operating system 132. For example, the service manager 134 receives input from a user requesting to create a new process. In another example, the service manager 134 receives a system call from an active process to create a new process. In some implementations, the service manager 134 may be a first process started by the kernel of the operating system 132 at boot up of the system 100. The service manager 134 can be a parent process of all the other child processes. A process can be a foreground process that interacts with a user and performs a function for the user. The process can also be a background process that has a specific function and is not associated with a particular user. For example, a background process can be a process that handles incoming requests for web pages hosted by the server and wakes up to service the request when the request arrives. Although only a service manager 134 is depicted in the example of FIG. 1, the operating system 132 may include other utility software or system software to configure and maintain the system 100.

In some implementations, the process table 136 is a data structure maintained by the kernel of the operating system 132 in a protected memory section. The process table 136 includes information to manage a particular process. The process table 136 includes a list of active processes executed by the kernel of the operating system 132. An entry in the process table 136 may include, for example, process identification data, process name, process state, process control data, priority, parent process information, process group, user identification data, flags, command line arguments, file location path, status, etc. In some implementations, the process table 136 is accessed and/or modified by the service manager 134.

In some implementations, a process that is initiated writes its unique process identifier (PID) to a file location (e.g., a pidfile). This pidfile is then available for the operating system 132 or other processes to look up the PID to communicate with the process. In some instances when a process is unexpectedly terminated or shut down, the process may not update the pidfile. The process may be restarted and assigned a new PID. The PID within the pidfile for the process remains the same or a second pidfile with the new PID may be created, causing confusion as to which process is running. The pidfile is no longer useful for look up and to communicate with the process because the process restarted with a different PID. In some implementations, the service manager 134 cooperates with the operating system 132 to track and manage processes directly in the process table 136 (for example, to add processes, terminate processes, set priorities, etc.) without referencing the processes by their PIDs. The service manager 134 does not use the PID of a process to refer to the process. Instead, the service manager 134 directly looks up the process in the process table 136. This approach is advantageous because the service manager 134 cannot lose track of a process even if the process is unexpectedly terminated, restarted again and then associated with a new PID. The PID mismatches are not a problem because the service manager 134 does not use the PID of the processes for process management.

Figure 2:
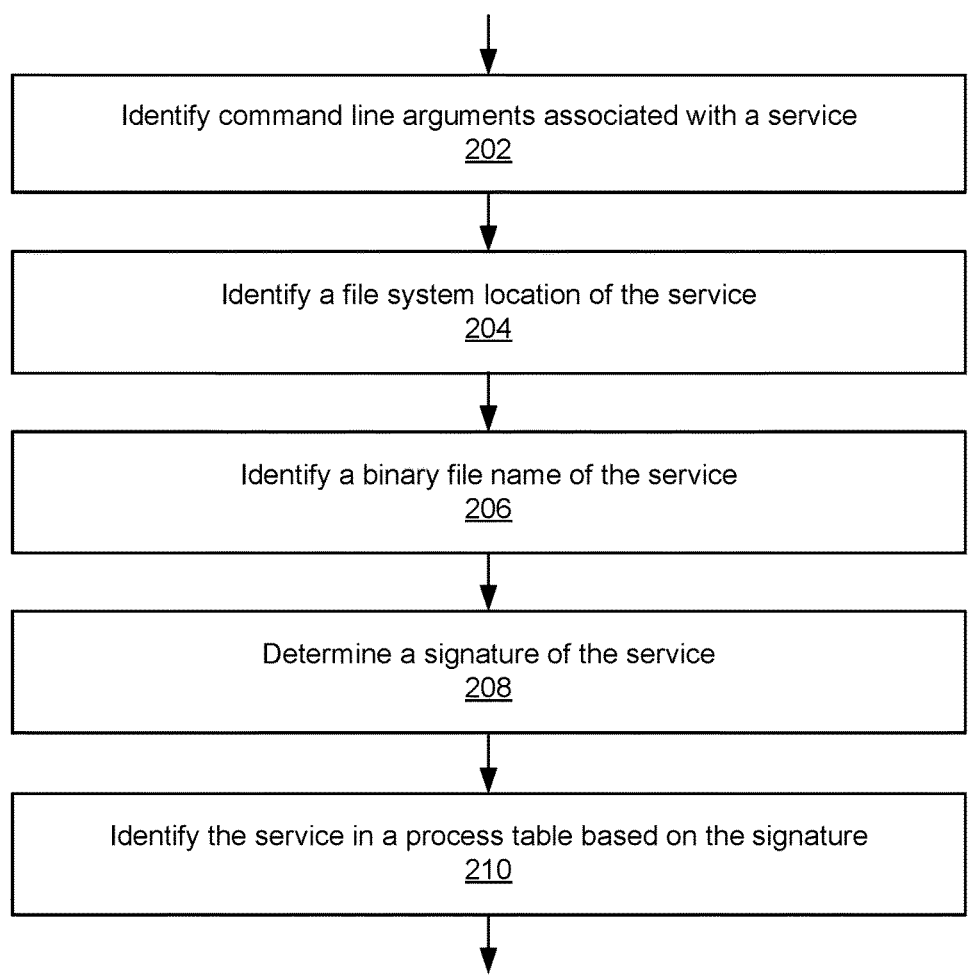
FIG. 2 is a flowchart of an example method for looking up a service in a process table, according to the techniques described herein.

FIG. 2 is a flowchart of an example method 200 for looking up a service in a process table, according to the techniques described herein. At 202, the service manager 134 identifies one or more command line arguments associated with a service. In some implementations, the service manager 134 identifies a manner in which a service was originally invoked by the user at the command line to initiate the service. At 204, the service manager 134 identifies a file system location of the service. A service is typically configured in a configuration file in a directory location. The configuration file defines a template for a service and describes the properties of the service. The service is a runtime embodiment of the configuration file.

At 206, the service manager 134 identifies a name of a binary file associated with the service. For example, the service manager 134 identifies the binary executable that launched the service. In some implementations, the name of the binary file can include a path to the executable. In some implementations, a service may be defined by one or more command line arguments, a name of a binary file and the file system location (i.e., path) on the system 100. At 208, the service manager 134 determines a signature of the service. The signature is unique to a service and can be used to identify the service corresponding to the signature in the process table 136. In some implementations, the signature can be based on service attributes, such as the command line arguments, the file system location and/or the name of the binary file of the service. In other implementations, the signature can be based on service attributes other than the command line arguments, the file system location and the name of the binary file of the service. For example, the signature may be an n-tuple of the service attributes, a concatenation of the service attributes (or some portion of the command line arguments), a hash or fingerprint of the service attributes, etc.

At 210, the service manager 134 identifies the service in a process table 136 based on the signature. The service manager 134 identifies the service matching the signature in the process table 136. In some implementations, a service may appear differently in the process table 136. For example, the service's binary file name may be different, and arguments can be hidden in the process table 136. In some implementations, the service manager 134 includes a regular expression defining a search pattern for identifying a service in the process table 136 that conforms to the search pattern. The service manager 134 uses the regular expression to parse the entries in the process table 136 and identify a matching service entry.

Figure 3:
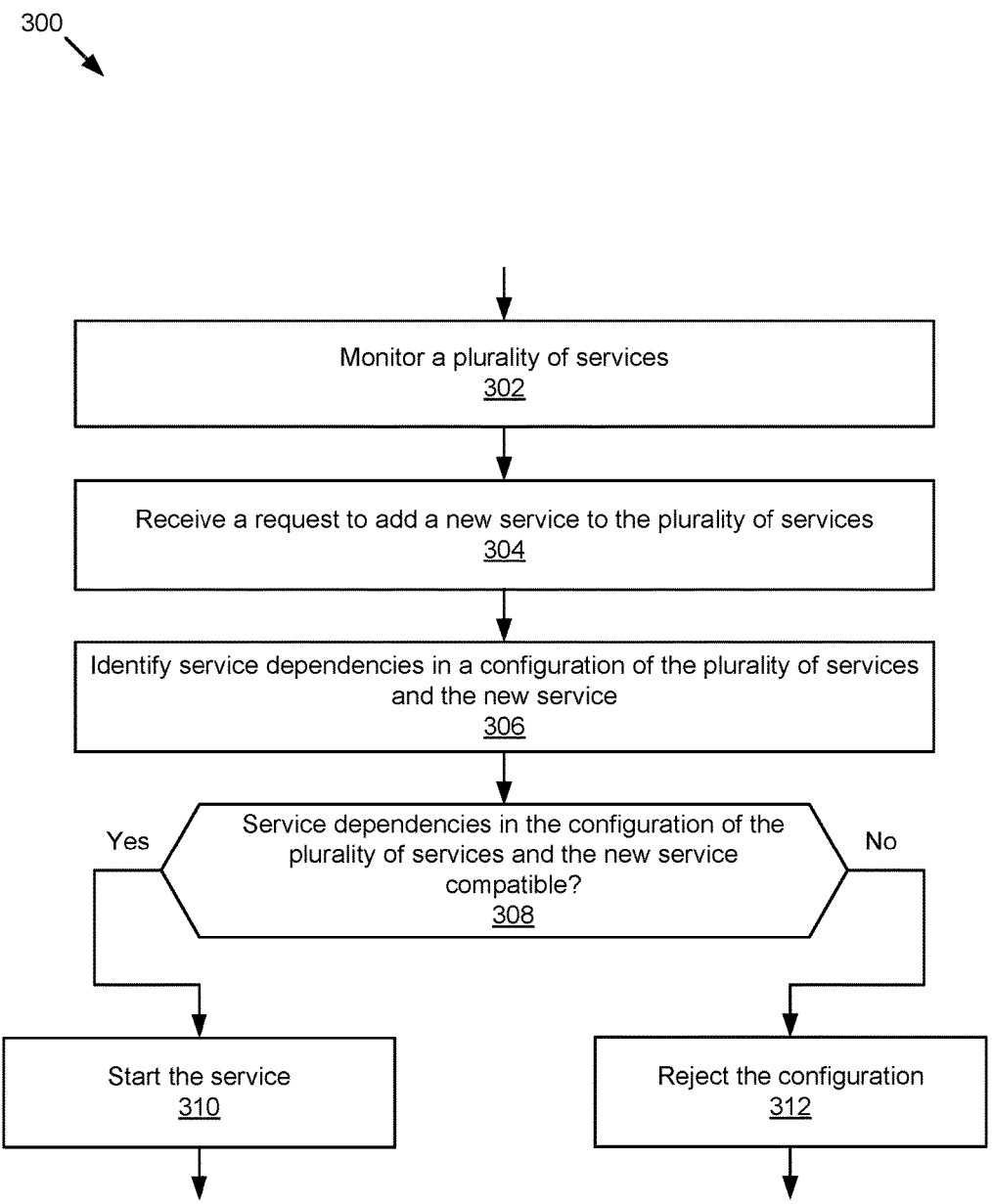
FIG. 3 is a flowchart of an example method for monitoring a plurality of services, according to the techniques described herein.

FIG. 3 is a flowchart of an example method 300 for monitoring a plurality of services, according to the techniques described herein. In some implementations, at 302, the service manager 134 monitors a plurality of services. As described above, the service manager 134 monitors the plurality of services directly in the process table 136 without relying on PIDs. The services within a process table 136 may depend on one another for proper operation. A service may have "dependencies" that identify what set of other services need to be started and/or stopped before the service can be started up successfully. The "dependencies" can be prerequisite services of the service, since the service is dependent on them. When the prerequisite services of a service stop and/or fail to start, the service may fail to start or operate properly. Then, the services that depend on the service may also fail or cease to function properly. The service dependencies dictate a certain order in which the plurality of services may start.

At 304, the service manager 134 receives a request to add a new service to the plurality of services. For example, a new service can be added when a user requests to create a new process. In another example, a new service can be created as a child process of an active parent process. At 306, the service manager 134 identifies service dependencies of the plurality of services and the new service. For example, the service manager parses configuration files for the plurality of services and the new service to identify the service dependencies. The service manager 134 checks the service dependencies before starting the new service. The service manager 134 adds the new service to a configuration of the plurality of services.

At 308, the service manager 134 determines whether the service dependencies in the configuration of the plurality of services and the new service are compatible. Services are compatible, for example, when there are no conflicts between services in a hierarchy of service dependencies. The service manager 134 checks whether the prerequisites or dependencies of each service in the configuration of the plurality of services and the new service is such that there will be no failure in starting the services. This approach is advantageous because it avoids problems (e.g., deadlocks) that may arise when the new service is started and the dependencies of the new service conflict with the dependencies of the plurality of services currently active in the process table 136. If the service dependencies are compatible, at 310, the service manager 134 starts the service. The service manager 134 creates a new entry for the service in the process table 136. If the service dependencies are not compatible, at 312, the service manager 134 rejects the configuration and does not start the service.

Figure 4A:
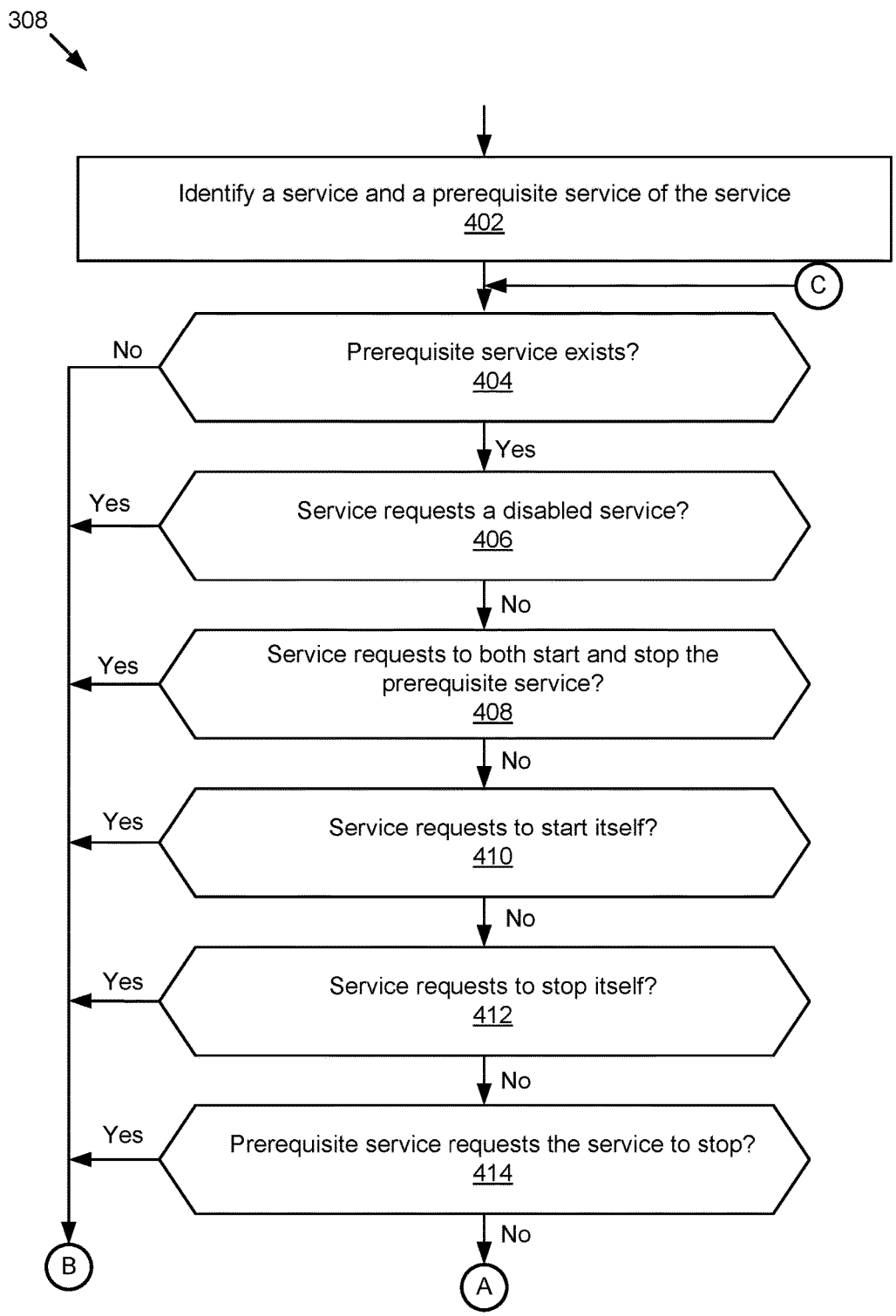
FIGS. 4A and 4B are flowcharts of an example method for determining whether service dependencies in a configuration of a plurality of services are compatible, according to the techniques described herein.
Figure 4B:
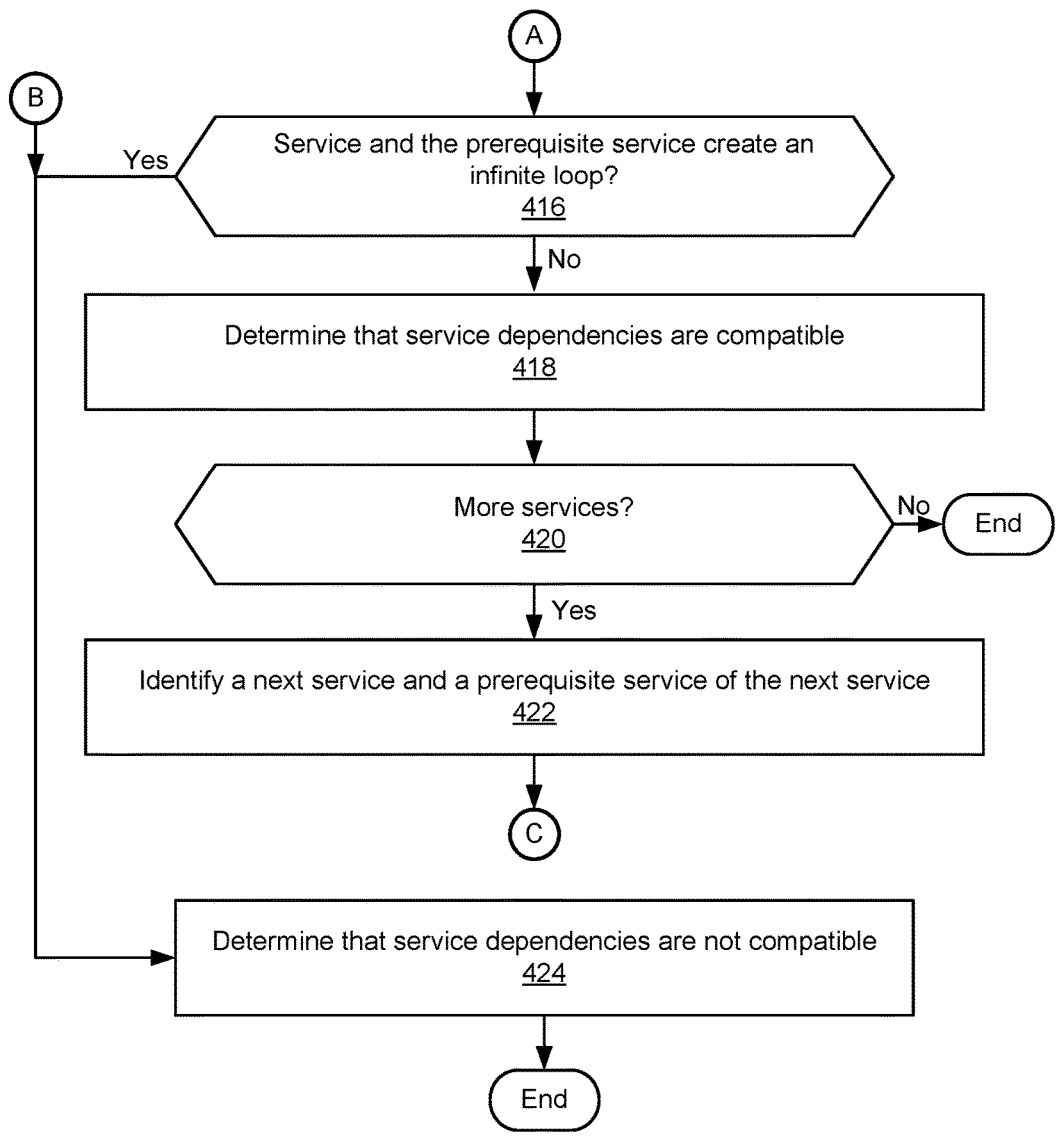

In some implementations, the service manager 134 compiles the plurality of services and requested dependencies of each service in the plurality of services. When a new service is requested, the service manager 134 performs a set of checks to determine whether service dependencies are compatible. FIGS. 4A and 4B are flowcharts of an example method 308 for determining whether service dependencies in a configuration of a plurality of services and a new service are compatible, according to the techniques described herein. At 402, the service manager 134 identifies a service and a prerequisite service of the service. For example, a service A is dependent on a service B to start before the service A can start. The service B is a prerequisite service of the service A. Similarly, the service A can be dependent on the service B to stop before the service A can start. In another example, a service A can be dependent on the service B to have a delayed start to ensure that the service A is running. In yet another example, a service A can be dependent on the service B to be disabled.

At 404, the service manager 134 determines whether the prerequisite service exists. If the prerequisite service does not exist, the method 308 skips to 424, and the service manager 134 determines that the service dependencies are not compatible. If the prerequisite service exists, at 406, the service manager 134 determines whether the service requests a disabled service. For example, the service manager 134 may have stopped a service permanently or temporarily. The service manager 134 determines whether a service under consideration is requesting and is dependent on such a disabled service, which can be a problem if the service were to run. If the service requests a disabled service, the method 308 skips to 424, and the service manager 134 determines that the service dependencies are not compatible.

If the service does not request a disabled service, at 408, the service manager 134 determines whether the service requests to both start and stop the prerequisite service. For example, a service A may have a faulty service dependency where it can request to both start and stop another service B before service A can start. If the service requests to both start and stop the prerequisite service, the method 308 skips to 424, and the service manager 134 determines that the service dependencies are not compatible. If the service does not request to both start and stop the prerequisite service, at 410, the service manager 134 determines whether the service requests to start itself. If the service requests to start itself, the method 308 skips to 424, and the service manager 134 determines that the service dependencies are not compatible. If the service does not request to start itself, at 412, the service manager 134 determines whether the service requests to stop itself. If the service requests to stop itself, the method 308 skips to 424, and the service manager 134 determines that the service dependencies are not compatible.

If the service does not request to stop itself, at 414, the service manager 134 determines whether the prerequisite service requests the service to stop. For example, a service A may request a prerequisite service B. The service B may have a dependency that requests the service A to be stopped. If the prerequisite service requests the service to stop, the method 308 skips to 424, and the service manager 134 determines that the service dependencies are not compatible. If the prerequisite service does not request the service to stop, at 416, the service manager 134 determines whether the service and the prerequisite service create an infinite loop. For example, an infinite loop can be a scenario where a service A has a dependency that requests a prerequisite service B to start, and the service B has an opposite dependency where the service A is its prerequisite service and requests the service A to start. If such conflicting dependencies are not checked beforehand and the service manager 134 starts the services A and B, the services A and B may consume a large amount of system resources by getting stuck in an infinite loop of starting new services.

If the service and the prerequisite service would create an infinite loop, the method skips to 424, and the service manager 134 determines that the service dependencies are not compatible. If the service and the prerequisite service would not create the infinite loop, at 418, the service manager 134 determines that the service dependencies are compatible.

At 420, the service manager 134 determines whether there are more services to check for dependencies in the plurality of services. The service manager 134 iterates through the rest of the dependencies in the plurality of services. If there are more services to check, at 422, the service manager 134 identifies a next service and a prerequisite service of the next service, and the method 308 repeats the process starting at 404. If there are no more services to check, the method 308 ends.

In some implementations, the service manager 134 may receive a request to display a list of processes on a user interface (not shown) associated with the system 100. The service manager 134 accesses the process table 136 and retrieves process information for display. For example, the process information displayed to a user may include a process name, a process description, an amount of memory used by a process, an amount of time for which a central processing unit (CPU) is used by a process, a status of the process, etc. In some implementations, the service manager 134 may also determine performance statistics based on the process information and display the performance statistics to a user. For example, the performance statistics may include a total amount of memory usage, disk usage, disk I/O speed, etc. In some implementations, the service manager 134 maintains a collective state of the plurality of services in the system 100 and provides the user with the collective state of the plurality of services.

Figure 5:
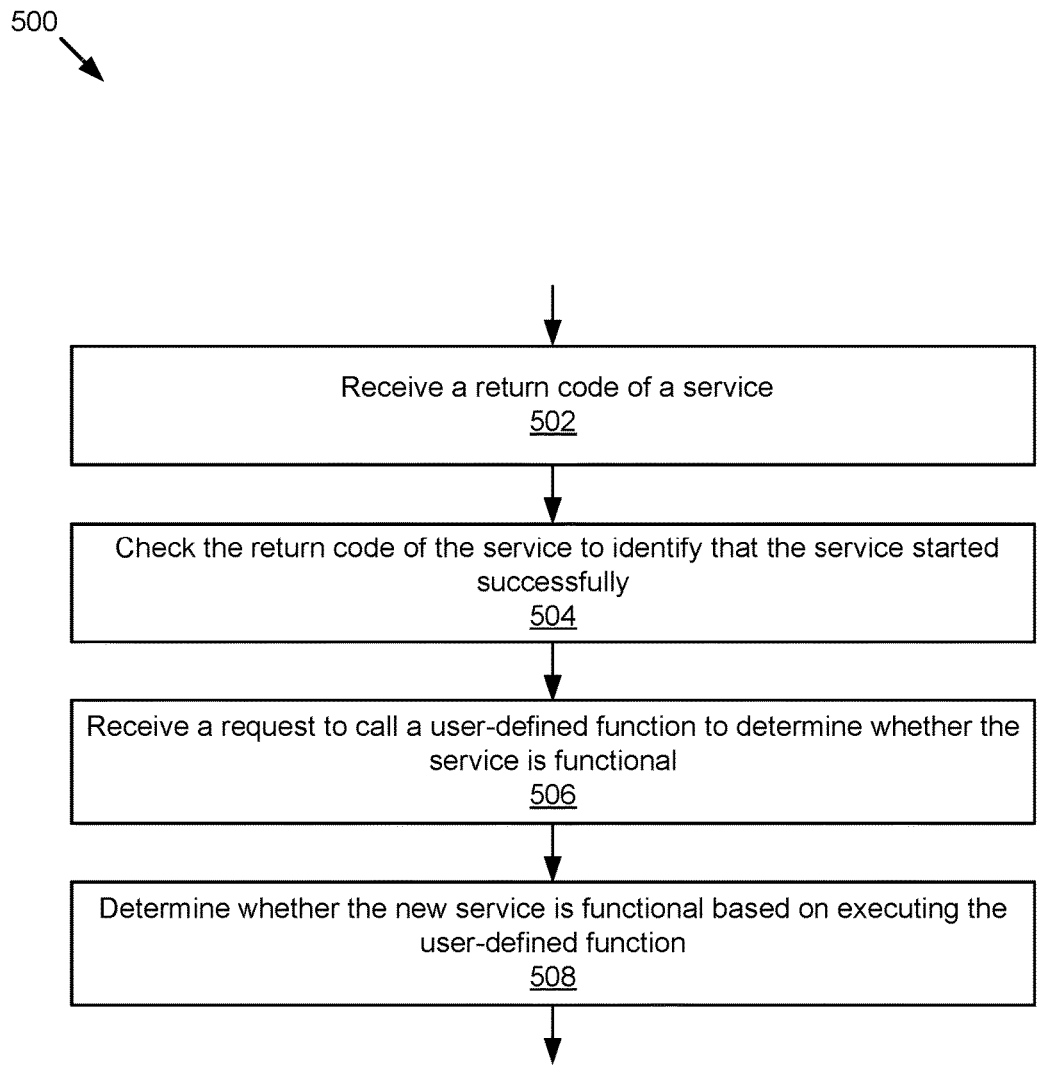
FIG. 5 is a flowchart of an example method for determining whether a service is functional, according to the techniques described herein.

In some implementations, the service manager 134 provides an optional configuration field to determine whether a service is functional. An ordinary status retrieved from the process table 136 and displayed to a user may indicate whether a service started up successfully or is running. A service starting up successfully is quite different from the service being functional. FIG. 5 is a flowchart of an example method 500 for determining whether a service is functional, according to the techniques described herein. At 502, the service manager 134 receives a return code of a service. A return code is a small number that is passed by the service to the service manager 134 when the service successfully starts up. In another example, the service manager 134 may also identify that a return code is sent from a child process to a parent process that spawned the child process.

At 504, the service manager 134 checks the return code of the service to identify that the service started successfully. For example, a non-zero return code may indicate a failure in the service starting up successfully. At 506, the service manager 134 receives a request to call a user-defined function to determine whether the service is functional. The service manager 134 provides an option for the user to supply a "callback" function as a parameter to check whether the service is functional. For example, the user-defined function provided as a parameter can be a ping command, a telnet to port, a custom program for checking a status of the service, etc. At 508, the service manager 134 determines whether the new service is functional based on executing the user-defined function. In some implementations, the service manager 134 executes the user-defined function to check whether the service is functional after a certain period of time. For example, the service manager 134 calls the user-defined function after the return code is received from the service.

Systems and methods for managing services on computer systems without relying on process identifiers are described above. In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to user interfaces and particular hardware. Moreover, the technologies disclosed above primarily in the context of on line services; however, the disclosed technologies apply to other data sources and other data types (e.g., collections of other resources for example images, audio, web pages).

Reference in the specification to "one implementation" or "an implementation" means that a particular feature, structure, or characteristic described in connection with the implementation is included in at least one implementation of the disclosed technologies. The appearances of the phrase "in one implementation" in various places in the specification are not necessarily all referring to the same implementation.

Some portions of the detailed descriptions above may be presented in terms of processes and symbolic representations of operations on data bits within a computer memory. A process can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers or the like.

These and similar terms can be associated with the appropriate physical quantities and can be considered labels applied to these quantities. Unless specifically stated otherwise as apparent from the prior discussion, it is appreciated that throughout the description, discussions utilizing terms for example "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, for example, but is not limited to, any type of disk including floppy disks, optical disks, CD-ROMs, and magnetic disks, read-only memories (ROMs), random access memories (RAMs), erasable programmable read-only memories (EPROMs), electrically erasable programmable read-only memories (EEPROMs), magnetic or optical cards, flash memories including Universal Serial Bus (USB) keys with non-volatile memory or any type of media suitable for storing electronic instructions, each coupled to a computer system bus.

The disclosed technologies can take the form of an entirely hardware implementation, an entirely software implementation or an implementation containing both hardware and software elements. In some implementations, the technology is implemented in software, which includes but is not limited to firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description above. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A computer-implemented method comprising:
monitoring a plurality of services, wherein:
each service is a process managed by an operating system and running on a computer, wherein the process is uniquely identifiable in a process table of the operating system based on a signature;
the signature is based on a combination of at least two service attributes in an entry in the process table for the process, wherein at least one service attribute of the at least two service attributes comprises one or more of a file system location and a command line argument associated with the service;
the signature excludes a unique process identifier assigned to the process and included in the entry for the process in the process table; and
the signature is used to identify each of the plurality of services in the process table for monitoring the plurality of services;
receiving a request to add a new service to the plurality of services;
determining, using signatures to lookup processes in the process table, whether service dependencies of the plurality of services in the process table and the new service are compatible; and
responsive to determining that the service dependencies of the plurality of services in the process table and the new service are compatible:
starting the new service; and
determining a new signature for the new service based on a new entry in the process table for the new service.

2. The computer-implemented method of claim 1, wherein:
at least one service attribute of the at least two service attributes comprises one or more of a process name, a process state, process control data, a priority, parent process information, a process group, user identification data, flags, and a name of a binary file associated with the service.

3. The computer-implemented method of claim 1, wherein determining whether the service dependencies of the plurality of services in the process table and the new service are compatible comprises:
determining that the plurality of services in the process table are compatible with the new service in response to determining that a prerequisite service of the new service exists in the process table.

4. The computer-implemented method of claim 1, wherein determining whether the service dependencies of the plurality of services in the process table and the new service are compatible comprises:
determining that the plurality of services in the process table are not compatible with the new service in response to determining that the new service and a prerequisite service of the new service create an infinite loop.

5. The computer-implemented method of claim 1, wherein determining whether the service dependencies of the plurality of services in the process table and the new service are compatible comprises:
determining that the plurality of services in the process table are not compatible with the new service in response to determining that the new service requests a disabled service.

6. The computer-implemented method of claim 1, wherein determining whether the service dependencies of the plurality of services in the process table and the new service are compatible comprises:
determining that the plurality of services in the process table are not compatible with the new service in response to determining that the new service requests to both start and stop a prerequisite service of the new service.

7. The computer-implemented method of claim 1, wherein determining whether the service dependencies of the plurality of services in the process table and the new service are compatible comprises:
determining that the plurality of services in the process table are not compatible with the new service in response to determining that the new service requests to start itself.

8. The computer-implemented method of claim 1, wherein determining whether the service dependencies of the plurality of services in the process table and the new service are compatible comprises:
determining that the plurality of services in the process table are not compatible with the new service in response to determining that the new service requests to stop itself.

9. The computer-implemented method of claim 1, further comprising:
responsive to determining that the service dependencies of the plurality of services in the process table and the new service are compatible:
receiving a return code of the new service; and determining that the new service started up successfully based on the return code.

10. The computer-implemented method of claim 1, further comprising:
responsive to determining that the service dependencies of the plurality of services in the process table and the new service are compatible:
receiving a request to call a user-defined function; and
determining whether the new service is functional based on executing the user-defined function.

11. A system comprising:
one or more processors; and
a memory storing instructions that, when executed by the one or more processors, cause the one or more processors to:
monitor a plurality of services, wherein:
each service is a process managed by an operating system and running on a computer, wherein the process is uniquely identifiable in a process table of the operating system based on a signature;
the signature is based on a combination of at least two service attributes in an entry in the process table for the process, wherein at least one service attribute of the at least two service attributes comprises one or more of a file system location and a command line argument associated with the service;
the signature excludes a unique process identifier assigned to the process and included in the entry for the process in the process table; and
the signature is used to identify each of the plurality of services in the process table for monitoring the plurality of services;
receive a request to add a new service to the plurality of services;
determine, using signatures to lookup processes in the process table, whether service dependencies of the plurality of services in the process table and the new service are compatible; and
responsive to determining that the service dependencies of the plurality of services in the process table and the new service are compatible:
start the new service; and
determine a new signature for the new service based on a new entry in the process table for the new service.

12. The system of claim 11, wherein:
at least one service attribute of the at least two service attributes comprises one or more of a process name, a process state, process control data, a priority, parent process information, a process group, user identification data, flags, and a name of a binary file associated with the service.

13. The system of claim 11, wherein to determine whether the service dependencies of the plurality of services in the process table and the new service are compatible, the instructions cause the one or more processors to:
determine that the plurality of services in the process table are compatible with the new service in response to determining that a prerequisite service of the new service exists in the process table.

14. The system of claim 11, wherein to determine whether the service dependencies of the plurality of services in the process table and the new service are compatible, the instructions cause the one or more processors to:
determine that the plurality of services in the process table are not compatible with the new service in response to determining that the new service and a prerequisite service of the new service create an infinite loop.

15. The system of claim 11, wherein to determine whether the service dependencies of the plurality of services in the process table and the new service are compatible, the instructions cause the one or more processors to:
determine that the plurality of services in the process table are not compatible with the new service in response to determining that the new service requests a disabled service.

16. The system of claim 11, wherein to determine whether the service dependencies of the plurality of services in the process table and the new service are compatible, the instructions cause the one or more processors to:
determine that the plurality of services in the process table are not compatible with the new service in response to determining that the new service requests to both start and stop a prerequisite service of the new service.

17. The system of claim 11, wherein to determine whether the service dependencies of the plurality of services in the process table and the new service are compatible, the instructions cause the one or more processors to:
determine that the plurality of services in the process table are not compatible with the new service in response to determining that the new service requests to start itself.

18. The system of claim 11, wherein to determine whether the service dependencies of the plurality of services in the process table and the new service are compatible, the instructions cause the one or more processors to:
determine that the plurality of services in the process table are not compatible with the new service in response to determining that the new service requests to stop itself.

19. The system of claim 11, wherein the instructions further cause the one or more processors to:
responsive to determining that the service dependencies of the plurality of services in the process table and the new service are compatible:
receive a return code of the new service; and
determine that the new service started up successfully based on the return code.

20. The system of claim 11, wherein the instructions further cause the one or more processors to:
responsive to determining that the service dependencies of the plurality of services in the process table and the new service are compatible:
receive a request to call a user-defined function; and
determine whether the new service is functional based on executing the user-defined function.

21. A system, comprising:
means for monitoring a plurality of services, wherein:
each service is a process managed by an operating system and running on a computer, wherein the process is uniquely identifiable in a process table of the operating system based on a signature;
the signature is based on a combination of at least two service attributes in an entry in the process table for the process, wherein at least one service attribute of the at least two service attributes comprises one or more of a file system location and a command line argument associated with the service;
the signature excludes a unique process identifier assigned to the process and included in the entry for the process in the process table; and
the signature is used to identify each of the plurality of services in the process table for monitoring the plurality of services;

means for receiving a request to add a new service to the plurality of services;

means for determining, using signatures to lookup processes in the process table, whether service dependencies in the plurality of services and the new service are compatible means for starting, the responsive to determining that the service dependencies of the plurality of services and the new service are comparible, the new service.

22. The computer-implemented method of claim 1, wherein the signature for each service is determined by processing the combination of at least two service attributes by a process selected from concatenation and calculating a hash.

23. The system of claim 21, wherein the signature for each service is determined by processing the combination of at least two service attributes by a process selected from concatenation and calculating a hash.

* * * * *